Dec. 12, 1972 W. M. REGITZ ET AL 3,706,084

MASS MEMORY SYSTEM

Filed Oct. 27, 1969 2 Sheets-Sheet 1

INVENTORS
WILLIAM M. REGITZ
THOMAS M. DUNDON
BY Leo Stanger
ATTORNEY

Dec. 12, 1972 W. M. REGITZ ET AL 3,706,084

MASS MEMORY SYSTEM

Filed Oct. 27, 1969 2 Sheets-Sheet 2

INVENTORS
WILLIAM M. REGITZ
THOMAS M. DUNDON

BY Leo Stanger

ATTORNEY

United States Patent Office 3,706,084

Patented Dec. 12, 1972

3,706,084

MASS MEMORY SYSTEM

William M. Regitz, Franklin, and Thomas M. Dundon, Southboro, Mass., assignors to Honeywell Inc., Minneapolis, Minn.

Filed Oct. 27, 1969, Ser. No. 869,618
Int. Cl. G11b 5/00
U.S. Cl. 340—174.1 9 Claims

ABSTRACT OF THE DISCLOSURE

In the recording of binary information by a phase modulation technique, a single guard bit is used between independently written data blocks. This guard bit is chosen to be the complement of the first data bit in the data block.

BACKGROUND OF THE INVENTION

The present invention relates to recording of binary information and more particularly to methods and means for recording and detecting binary signals with a phase modulation technique.

In saturation-type magnetic recording, binary signals are usually recorded by reversing the magnetic flux, i.e. by effecting a step-like change in magnetization from one remanent state of saturation of the recording medium to the opposite state. The flux reversals, or bits, are recorded in a time sequence in syncronism with a series of regularly occurring clock signals. The frequency of the clock signals controls the rate at which the signals are recorded and is synchronous with the rate at which signals are read from the recording medium and also defines the clock interval, that is, the time period between adjacent clock signals.

Phase modulation recording is a saturation-type recording technique which is self-clocking, i.e., there is a flux reversal at least at the midpoint of each clock interval. It is to be appreciated that phase modulation recording encompasses any digital coding scheme whereby the recording medium is physically modified at approximately the midcell position so as to indicate a particular binary value by such physical modification. The phase modulation recording technique can be explained as one in which a reversal of magnetic flux occurs at the midpoint of each clock interval, known as bit time, and the direction of the reversal at this time is indicative of the binary value of the data recorded. Two consecutive unlike data bits require only one flux reversal per clock interval. However, in order that two identical reversals occur for two consecutive identical data bits, a non-significant flux reversal must occur between the two bit times.

During readout, each magnetic flux reversal results in a voltage peak that corresponds in polarity to the direction of reversal. The readout process of phase-modulation recorded signals requires identification of the data signal peak polarity at bit time and the rejection of data signal information between bit times, namely at the end of the clock intervals. This process is complicated by the problem of bit shift, i.e. the tendency of the data bit signal peaks to be shifted from their assigned bit time location toward or away from an adjacent signal peak. Since both the amount and the direction of this shift are irregular and variable, the task of distinguishing the true data signal peak becomes exacting. Moreover, because of electrical limitations, and because the group of flux reversals that forms a word may be possibly offset from the true bit time when a new word is written, the shift of a signal peak is likely to be greatest in the bit closest to an adjacent word. In particular, reading this first bit is difficult.

As previously mentioned, the phase modulation technique is capable of being self-clocking. Once a true data bit signal peak is read, the next true data bit signal peak will occur at a bit time spaced approximately one clock interval from the first read signal peak. Bit shift for information written after the first bit can either be contained within reading circuitry tolerances or compensated for by various techniques.

However, because a signal peak may indicate either a bit or a non-significant reversal between identical bits it is difficult to distinguish the first true data peak from a non-significant peak at the start of each word. In their effort to solve this problem, prior art recording techniques have used physical gaps of non-recorded surface between the independently written words to prevent the disturbance from a later written adjacent bit which will shift the first bit signal peak from the desired location, or they have used fixed sequences of initial bits called preambles before the words. These techniques lower information bit density and lessen average reading speed.

SUMMARY OF THE INVENTION

It is a primary object of the invention to improve such recording methods and means and particularly to obviate such disadvantages.

It is another object of the invention to allow reliable high speed magnetic recording and reading with a minimum space, preferably only a single bit, between separately written data blocks.

It is another object of the invention to prevent incorrect self-clocking caused by an initial erroneous identification of a false data signal peak as a true data signal peak.

According to the invention, when a stream of data bits is to be written, a guard bit is first written. This guard bit is chosen to be the complement of the first data bit.

It is an advantage of the invention that no non-significant signal peak occurs between the first two bits in a stream of bits that make up a data block.

It is another advantage of the invention that some bit shift in the first written bit is tolerable.

These and other features of the invention are pointed out in the claims. Other objects and advantages of the invention will become obvious from the following detailed description when read in light of the accompanying drawings.

DETAILED DESCRIPTION OF THE PREFERRED EMBODIMENT OF THE INVENTION

Figure 1:
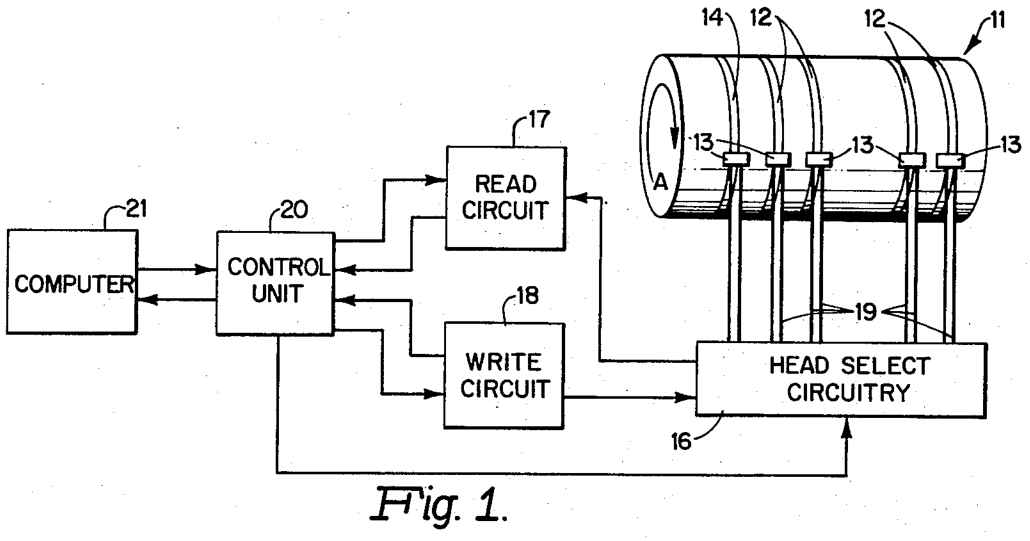
FIG. 1 is a block diagram of a rotating magnetic cylindrical storage drum in a system environment embodying features of the invention.

In FIG. 1, the magnetic drum 11 consists of circumferential tracks 12 of magnetically recorded information. Associated with each track 12 is a read/write head 13 which is in close proximity with the track and acts to erase, record and recover information on the track. There is also a clock track 14 on the drum which is ordinarily written upon only once. This clock track 14 is prerecorded and provides continuous clock pulses which are used for timing operations. There are two trains of clock pulses which indicate the midpoint and the end point of a clock interval respectively. The rest of the rotating cylindrical magnetic drum surface contains the data tracks 12.

The rotation of the drum 11 as indicated by arrow A causes a changing magnetic flux from the tracks 12 to be detected by respective read/write heads 13 and thereby induces a playback signal in each head which is proportional to the time rate of change of the magnetic flux. When writing, a selected read/write head 13 itself is being electrically driven so as to induce a desired magnetic flux pattern onto the track 12. The read/write heads 13 are individually connected by two lines 19 to the head select circuitry 16. Included within the head select circuitry 16 is logic suitable for selecting the correct one of the plurality of read/write heads 13 to perform a particular reading or writing operation. Read circuit 17 and write circuit 18 perform their functions through the head selection circuitry 16. A particular operation using the read circuit 17 or the write circuit 18 and a particular head 13 activated by head select circuitry 16 are chosen in accordance with a command from a control unit 20 which operates in response to requests from a computer 21.

Figure 2:
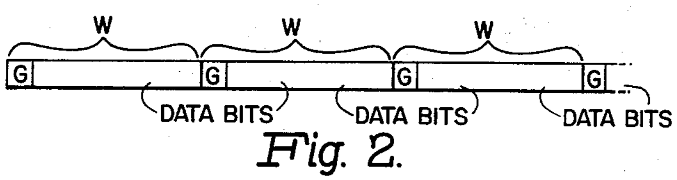
FIG. 2 is a general view of the word format of the system in FIG. 1.

As shown in FIG. 2, the format of the data on the drum is in the form of fixed length digital words W written along each track. Each track has space to have written thereon over 1500 words. There are approximately 128 tracks. As shown by the detailed format drawing of FIG. 3, a word W begins with a guard bit G and is then followed by 16 data bits D, and ends with a parity bit P. The words W are recorded immediately adjacent each other, thus the guard bit G of the succeeding word is immediately adjacent to the parity bit P of the preceding word.

Adjacent words need not necessarily be recorded consecutively. Any word may be erased and replaced with a new word in the space formerly occupied by it. Such newly written words may be offset relative to adjacent words. This occurs because the words may be recorded under slightly different environmental conditions so as to displace one or both from their absolute ideal position on the track. Because the first bit, namely the guard bit, of one word and the last bit of the next, possibly offset, word are the bits of different words closest to each other, the magnetic distortion causing bit shift is most likely to occur at these bits.

As explained, the guard bit G is chosen to have the value of the binary complement of the data bit D immediately following it. The parity bit P is chosen to give an even parity to its associated word not including the guard bit.

Figures 3, 4, 5, 6, 7, 9, 10:
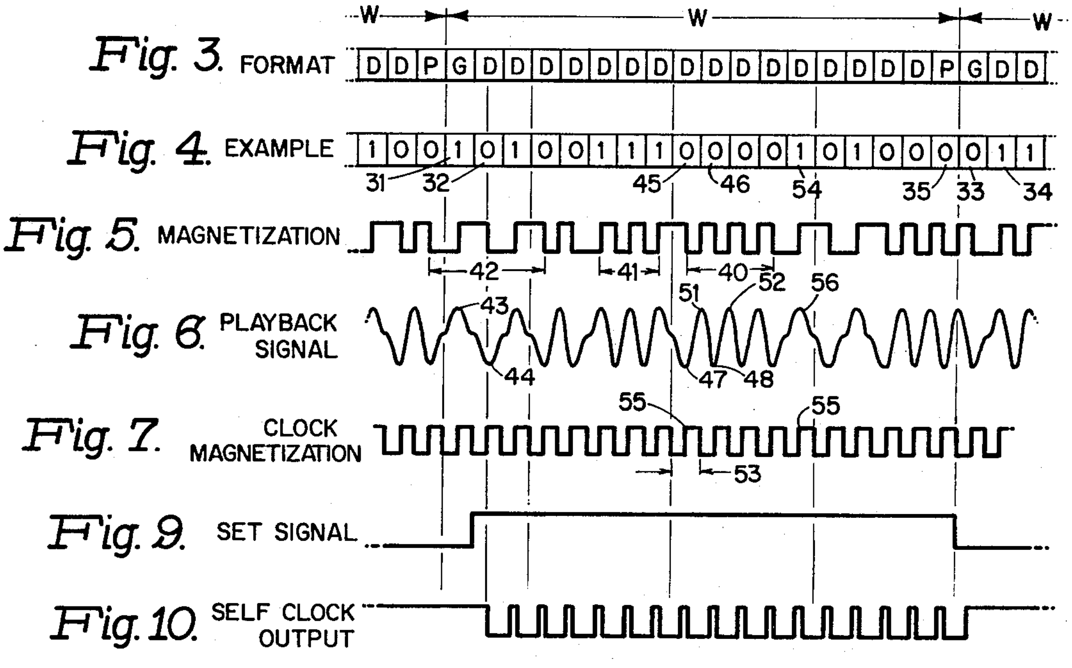
FIG. 3 is a block diagram illustrating the details of the data format of the system in FIGS. 1 and 2.
FIG. 4 is an example of a particular bit configuration in the format of FIG. 3.
FIG. 5 is a magnetization curve of a track of the drum in FIG. 1 when magnetized with the bit configuration of FIG. 4.
FIG. 6 is a voltage diagram of the output induced by the magnetization of FIG. 5 is a sensing head.
FIG. 7 is a magnetization curve of the clock track in the drum of FIG. 1.
FIG. 9 is a set signal derived from the enabling circuit in FIG. 8.
FIG. 10 is a curve of the self-clocking circuit output in FIG. 8.

In the example drawing of FIG. 4, a particular bit configuration has been selected as an example for discussion. Guard bit 31 is the complement of the first data bit 32, and guard bit 33 is the complement of its first data bit 34. Parity bit 35 gives the data of the preceding word an even parity. The Magnetization drawing of FIG. 5 shows the magnetic flux levels recorded on the surface for the bit configuration of the Example drawing, with a positive transition in the middle of a data interval indicating a binary one value.

The Magnetization drawing of FIG. 5 consists of a series of high and low frequency segments. A high frequency segment such as 40 or 41 results from a series of like bits being recorded such as the series of binary zero bits exemplified by 40 and the series of binary one bits exemplified by 41. Although both segments have the same frequency, the bit time transitions are of opposite direction. Segment 42 shows a low frequency pattern generated because of the alternating nature of the binary values of the data bits.

As hereinbefore explained, the passage of the magnetic flux pattern, shown diagrammatically in the Magnetization drawing, under the read/write heads 13, produces a playback signal proportional to the derivative of the Magnetization drawing. High density recording causes consecutive playback peaks to blur together. This is shown in the Playback drawing of FIG. 6 in which a curve representative of the output of a read/write head 13 when reading is shown. It can be seen that the playback peak 43 which corresponds to the guard bit 31 is followed by playback signal peak 44 which is indicative of the first data bit 32. Because of the complementary nature of the guard bit and the first data bit, there is no playback signal peak between the peaks 43 and 44. The playback signal peak 47 which corresponds to data bit 45 and playback signal peak 48 which corresponds to data bit 46 have a non-significant playback peak 51 between them. If, for some reason, non-significant playback signal peak 51 was interpreted by the read circuit 17 as a true data peak, not only would the bit be interpreted erroneously as a one value, but also, the read circuit 17 would operate to cause the next playback signal peak interpreted as data to be peak 52 which would continue to cause erroneous operation.

As can be seen from the Clock Magnetization drawing of FIG. 7 the clock track 14 is a continuous recording of one value data. A clock interval 53 is shown as extending from one negative transition of the Clock Magnetization drawing to the following negative transition. By continuously redaing the plaback signal (not shown) generated from this recording, a high frequency signal would be observed in which the positive peaks were representative of bit time and the negative peaks occurred at the end point of a clock interval. Thus, the positive clock transition 55 would provide an indication of the bit time of data bit 54 which is represented by playback signal peak 56.

Figure 8:
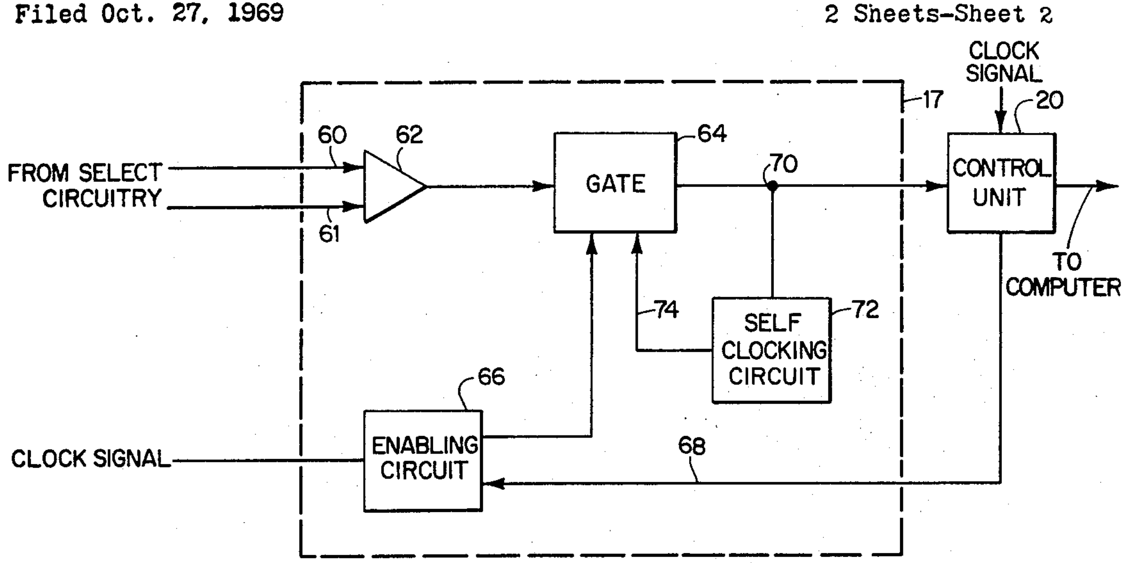
FIG. 8 is block of a portion of the read circuit in FIG. 1.

In FIG. 8 apparatus is shown in diagrammatic form of the initial section of read circuit 17. The read circuit 17 of FIG. 8 is also disclosed on pp. 5–33 of the Honeywell publication Document No. 130072029A entitled "Small Mass Store Controller Option Manual," first printed in September 1968, and first made publicly available in November 1968 and obtainable from Honeywell Information Systems, Framingham, Mass. A pair of lines 60 and 61, carrying the desired playback signal, come in from a read/write head 13 via the head select circuitry 16. This signal is amplified by an amplifier 62.

A gate 64 allows all the bits but the guard bit G in the word being read to pass from the amplifier 62 to the control unit 20. By counting clock pulses derived from the magnetization appearing in FIG. 7, the control unit 20 is cognizant of circumferential drum position with respect to heads 13. Therefore, when a particular word is desired, the control unit is able to apply a signal to enabling circuit 66 at the start of the word. The enabling circuit 66 in time synchronism with the clock signal then applies the set signal illustrated in FIG. 9 to the gate 64. As shown in FIG. 9 the set signal remains present for the duration of the word and is then removed. The length of this signal is determined by counting clock pulses so as to encompass at least the area in which the data bits could appear.

When the gate 64 is enabled it detects a playback signal peak and passes the binary information therein over lead 70 to control unit 20 which immediately stores the signal. In addition, the signal on lead 70 activates self-clocking circuit 72 which produces an output lasting three-quarters of a clock interval as shown in FIG. 10. The output of the self-clocking circuit 72 is passed to the gate 64 over lead 74 and is effective to block the non-significant playback signal between bit times. In FIG. 10 the low level indicates the period during which gate 64 is prevented from producing an output. The gate 64 is enabled during the period shortly preceding a true signal peak whose detection and subsequent indication on lead 70 is sufficient to again disable gate 64 through self-clocking circuit 72. At the end of the word, the enabling circuit 66 in response to control unit 20 and in time synchronism with the clock signal disables gate 64. The absence of any further binary indication on lead 70 causes self-clocking circuit 72 to resume its normal enabling state.

The write circuit 18 of FIG. 1 provides current to the read/write heads in a direction and magnitude sufficient to produce the flux pattern as indicated in the Magnetization drawing of FIG. 5. This means that current is provided in one direction until a flux reversal is desired and then the current direction is reversed. For phase modulation recording, the direction of the change of the flux at bit time is indicative of the information recorded. Therefore, a flux reversal always occurs at bit time. Thus a signal derived from the positive peaks of the clock track 14 playback signal which is indicative of bit time is used to command the write circuit 18 to reverse current direction. In addition, since an extra flux reversal is needed if the following data bit is identical to the one just recorded, the write circuit 18 will also reverse current direction at a time indicated by a negative peak of the clock track 14 playback signal if necessary. Electrical delays or head misalignment between clock and data tracks is not critical because although the data is recorded in conjunction with the clock track 14, it is self-clocked upon reading by the use of self-clocking circuit 72.

The write circuit 18 operates in a serial manner to record a word upon drum 11. The control unit 20 receives all the data bits of a word at once from the computer 21. It then operates to create the guard bit G and to pass this bit and the rest of the computer generated word serially to the write circuit 18.

Figure 11:
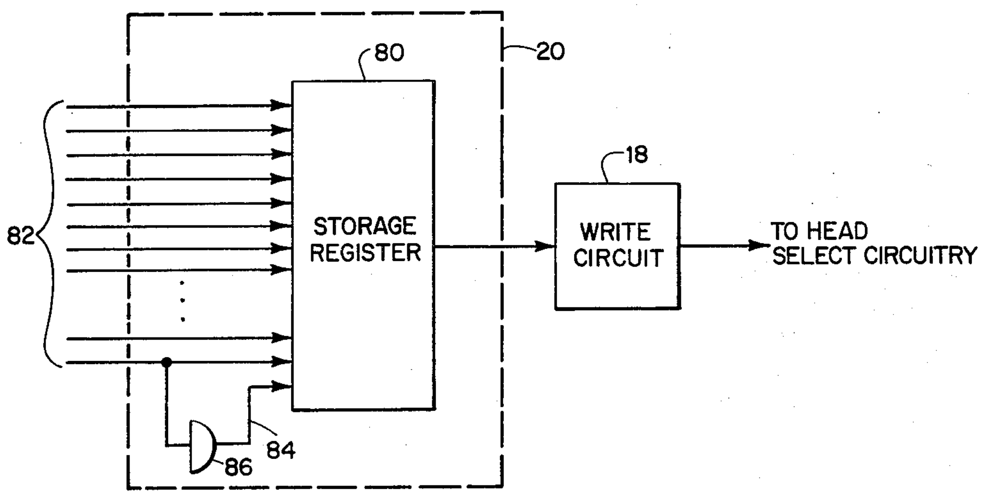
FIG. 11 shows a portion of the control unit of FIG. 1.

As shown on FIG. 11, storage register 80 receives a word to be written over lines 82 and operates to store this information. In addition to the lines 82, lead 84 from inverter circuit 86 also enters into the storage register 80 where its signal is stored. The input signal to inverter 86 is the first data bit of the word to be written as brought in over the appropriate lead in leads 82. The storage register thus receives a guard bit G which is the complement of the first data bit D. This results in a modified word in which the guard bit is appended prior to the first data bit. Then the stored information is passed serially, guard bit first, followed by the first data bit and subsequent data bits to the write circuit 18 at the proper time for recording on drum 11.

In operation, the computer 21 sends a request to control unit 20 to either read or write a word. The computer 21 also informs the control unit 20 of the address on the drum 11 to be read into or from. If a word is to be written, the computer 21 sends that word over to the control unit 20.

Upon receipt of a request to write a word accompanied by the drum address and the word, the control unit 20 creates the guard bit G by examining the first data bit D of the word W and generating its complement. This guard bit G is appended to the word preceding its first data bit and this composite word is then presented to the write circuit 18. Part of the address on the drum 11 is used by the head select circuitry 16 to connect the proper read/write head 13. The clock track signal is continually counted to monitor circumferential drum position. When the proper position on the drum 11 has been reached, the write circuit 18 produces the current necessary to establish the proper flux patterns as determined by the word passed to it from the control unit 20 in conjunction with the signals derived from the clock track 14.

If the computer 21 had requested that a word be read, then the control unit 20 would again have the head select circuitry 16 select the proper read/write head 13. Once again, by counting clock signals the proper word start location is determined and the read circuit 17 is enabled by control unit 20 to start passing the information read back to the control unit 20 for eventual transmittal back to the computer 21.

As explained in conjunction wtih FIG. 8, the guard bit playback signal peak is not read. Thus a less than maximum current level or mistiming in the flux reversal during the guard bit writing period will not affect later reading. When it is desired to read back a word, the amplifier 62 and gate 64 are given a longer time than normal to detect the first data peak. When reading in the middle of a word, the disabling effect of the self-clocking circuit 72 is effective to prevent any data output from the gate 64 for three quarters of the time between true data peaks. This, of course, is done to prevent a non-significant flux reversal from generating an erroneous output and thereafter a false self-clocking time.

The complementary guard bit G and members 66 and 64 assure that the first signal on line 70 will be proper to start the self-clocking operation.

Thus, the complementary guard bit allows a very dense packing of words on a track because only a single bit is used for separation between words. If the guard bit peak is shifted because of magnetic fringing effects from a later written preceding parity bit, this effect will not impede the later reading process. The words W written on the drum 11 need not be fixed at sixteen data bits. They may be comprised of a stream or block of data bits of any length preceded by a guard bit which is the complement of the first bit. Should various length data blocks be interspersed along a track 12, the computer 21 may inform the control unit 20 of the length if known. Alternatively, the control unit 20 could recognize a special bit configuration as the end mark. These techniques are well known in the art.

Although the invention has been described with respect to a head per track drum storage device, its extension is readily apparent to magnetic disk or tape type storage units. In fact, the invention is also applicable to any other type of storage technique that uses a phase modulation type of recording, e.g. a possible optical system. From the foregoing discussion it will be apparent that numerous modifications, departures, substitutions and equivalents may now occur to those skilled in the art, all of which fall within the true scope and spirit of the present invention.

What is claimed is:

1. A method of writing binary words with a phase modulation recording technique operating to store modified binary words having more than one bit each on a medium, comprising the steps of:

sensing the binary value of the first bit of a binary word;

generating a guard bit which is the binary complement of said first bit;

and serially recording said guard bit and said binary word consecutively and contiguously by phase modulation recording technique on said medium so as to form a modified binary word on said medium;

whereby said guard bit is the actual first recorded bit of a modified word stored on said medium.

2. The method of claim 1 wherein:

said modified word is recorded contiguous with a modified word which is previously recorded.

3. The method of claim 1 in which:

said medium is composed of magnetizable material, and said phase modulation recording technique causes magnetic flux reversals on said medium.

4. A method of recovering a binary word which has been previously recorded by physically modifying a medium according to a phase modulation technique so as to cause the medium to store one or two physical modifications per bit of information, comprising the steps of:

sensing the physical modifications in the record medium as they occur;

generating signals representative of the sensed physical modifications;

inhibiting the signal representative only of a first occurring physical modification;

transferring the signal representative of the next occurring physical modification as representative of a first information bit;

inhibiting, upon occurrence of said transfer step, the transfer of signals representative of further occurring physical modifications for a predetermined time;

transferring the signal representative of a physical modification occurring after said predetermined time; and alternately repeating the immediately preceding two steps until the binary word is recovered, whereby a reliable self-clocking recovery technique is created independent of the quality of said first physical modification.

5. The method of claim 4, in which:

said medium is composed of magnetizable material;

said physical modification is the orientation of flux direction.

6. Apparatus for recording binary words, comprising:

computer means for generating binary words composed of bits;

medium means for receiving and storing the binary words;

control means responsive to said computer means for sensing the binary value of the first bit of the binary word to be stored and for producing a guard bit which is the complement of said binary value of said first bit;

circuit means for appending said guard bit immediately prior to said first bit to form a modified binary word; and writing means connected to said circuit means and coupled to said medium means for recording said modified binary word by phase modulation recording technique on said medium means;

whereby said guard bit is the actual first recorded bit of said modified binary word.

7. The apparatus of claim 6 wherein;

said medium is composed of magnetizable material; and said phase modulation recording technique comprises in part means for generating magnetic flux reversals on said medium.

8. Apparatus for recovering a binary word which has been previously phase modulated recorded on a medium by physically modifying the medium within each bit period so as to cause the medium to store one or two physical modifications during each bit period comprising:

means for sensing the stored physical modifications;

means for generating signals representative of the sensed physical modifications;

means for gating the generated signals representative of the sensed physical modifications;

means connected to said gating means for inhibiting passage of the signal representative of only the first sensed physical modification of the word and to allow passage of the signals representative of the physical modifications occurring thereafter; and clocking means responsive to the signals representative of the physical modifications which are allowed to pass through said gating means for disabling said gating means for a predetermined portion of a bit period.

9. The apparatus of claim 8 wherein:

said medium is composed of magnetizable material; and said physical modifications are the directional orientations of magnetic flux within the magnetizable material.

References Cited

UNITED STATES PATENTS

| | | | |
|---|---|---|---|
| 3,195,118 | 7/1965 | St. Clair | 340—174.1 A |
| 3,374,475 | 3/1968 | Gabor | 340—274.1 G |
| 3,423,744 | 1/1969 | Gerlach et al. | 340—274.1 G |
| 3,508,228 | 4/1970 | Bishop | 340—174.1 H |

OTHER REFERENCES

Andrews: "Data Configuration for Magnetic Recording," IBM Tech. Disc., vol. 11, No. 2, July 1968, pp. 141–42.

Andrews et al.: "Data Configuration and False Start Rejection for Magnetic Recording," IBM Tech. Disc., vol. 11, No. 2, July 1968, pp. 139–40.

MAYNARD R. WILBUR, Primary Examiner

C. D. MILLER, Assistant Examiner

U.S. Cl. X.R.

340—174.1 H